(12) United States Patent
Nave et al.

(10) Patent No.: US 8,179,630 B2
(45) Date of Patent: May 15, 2012

(54) STORAGE SLOT FOR PORTABLE DATA STORAGE CARTRIDGES

(75) Inventors: Shawn Michael Nave, Tucson, AZ (US); Raymond Yardy, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 954 days.

(21) Appl. No.: 12/185,727

(22) Filed: Aug. 4, 2008

(65) Prior Publication Data
US 2010/0027209 A1 Feb. 4, 2010

(51) Int. Cl.
*G11B 15/68* (2006.01)
*G06F 19/00* (2006.01)

(52) U.S. Cl. .................. 360/92.1; 700/245
(58) Field of Classification Search .......... 360/92.1; 361/679.31; 700/245; 369/38, 40, 42, 65–69
See application file for complete search history.

(56) References Cited

U.S. PATENT DOCUMENTS

| | | | |
|---|---|---|---|
| 5,305,180 A | 4/1994 | Mitchell et al. | |
| 5,442,500 A * | 8/1995 | Hidano et al. | 360/92.1 |
| 5,846,096 A | 12/1998 | Ishida | |
| 5,959,866 A * | 9/1999 | Hanaoka et al. | 700/214 |
| 6,039,587 A | 3/2000 | Oguchi | |
| 6,315,583 B1 | 11/2001 | Nishioka | |
| 6,319,029 B2 | 11/2001 | Nishioka | |
| 6,338,636 B2 | 1/2002 | Nishioka | |
| 6,385,040 B2 | 5/2002 | Nabetani et al. | |
| 6,398,567 B1 | 6/2002 | Nishimura | |
| 6,816,388 B2 | 11/2004 | Junkins et al. | |
| 7,312,947 B2 * | 12/2007 | Jansen et al. | 360/92.1 |
| 7,400,469 B2 * | 7/2008 | Starr et al. | 360/92.1 |
| 7,477,478 B2 * | 1/2009 | Nave et al. | 360/92.1 |
| 7,843,663 B2 * | 11/2010 | Nave et al. | 360/92.1 |
| 7,893,841 B2 * | 2/2011 | Goodman et al. | 340/572.8 |
| 7,894,157 B2 * | 2/2011 | Green et al. | 360/92.1 |
| 2003/0063527 A1 * | 4/2003 | Ostwald | 369/30.5 |
| 2009/0225468 A1 * | 9/2009 | Goodman et al. | 360/92.1 |

* cited by examiner

*Primary Examiner* — Angel A. Castro
(74) *Attorney, Agent, or Firm* — Dale F. Regelman; Quarles & Brady LLP (57) ABSTRACT

A storage slot for multiple data storage cartridges, comprising a planar member having a first end, a second end, a side interconnecting the first end and the second end, and a gate moveably connected to the side at the first end of the planar member, wherein the gate can be moved between a closed position and an open position. The storage slot farther comprises a secondary catch moveably disposed between the first end and the second end. When the gate is disposed in a closed position, the secondary catch is disposed in a retracted orientation, and when the gate is disposed in an open position, the secondary catch is disposed in an extended orientation.

20 Claims, 14 Drawing Sheets

STORAGE SLOT FOR PORTABLE DATA STORAGE CARTRIDGES

FIELD OF THE INVENTION

This invention relates to a storage slot for portable data storage cartridges.

BACKGROUND OF THE INVENTION

Automated media storage libraries are known for providing cost effective access to large quantities of stored information. Generally, media storage libraries include a large number of storage slots on which are stored portable data storage cartridges. Such portable data storage cartridges comprise a data storage medium disposed therein. One or more robotic accessors access the portable data storage cartridges, and transport those portable data storage cartridges to a data storage device wherein information can be read from, or written to, the data storage medium disposed therein. Suitable electronics operate the accessor(s) and operate the data storage and retrieve system in order to transmit data to, and/or to receive data from, an attached host computer system.

SUMMARY OF THE INVENTION

Applicants' invention comprises a storage slot for multiple data storage cartridges. The storage slot comprises a planar member having a first end, a second end, a side interconnecting the first end and the second end, and a gate moveably connected to the side at the first end of the planar member, wherein the gate can be moved between a closed position and an open position.

The storage slot further comprises a secondary catch moveably disposed between the first end and the second end. When the gate is disposed in a closed position, the secondary catch is disposed in a retracted orientation, and when the gate is disposed in an open position, the secondary catch is disposed in an extended orientation.

BRIEF DESCRIPTION OF THE DRAWINGS

The invention will be better understood from a reading of the following detailed description taken in conjunction with the drawings in which like reference designators are used to designate like elements, and in which.

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 4:
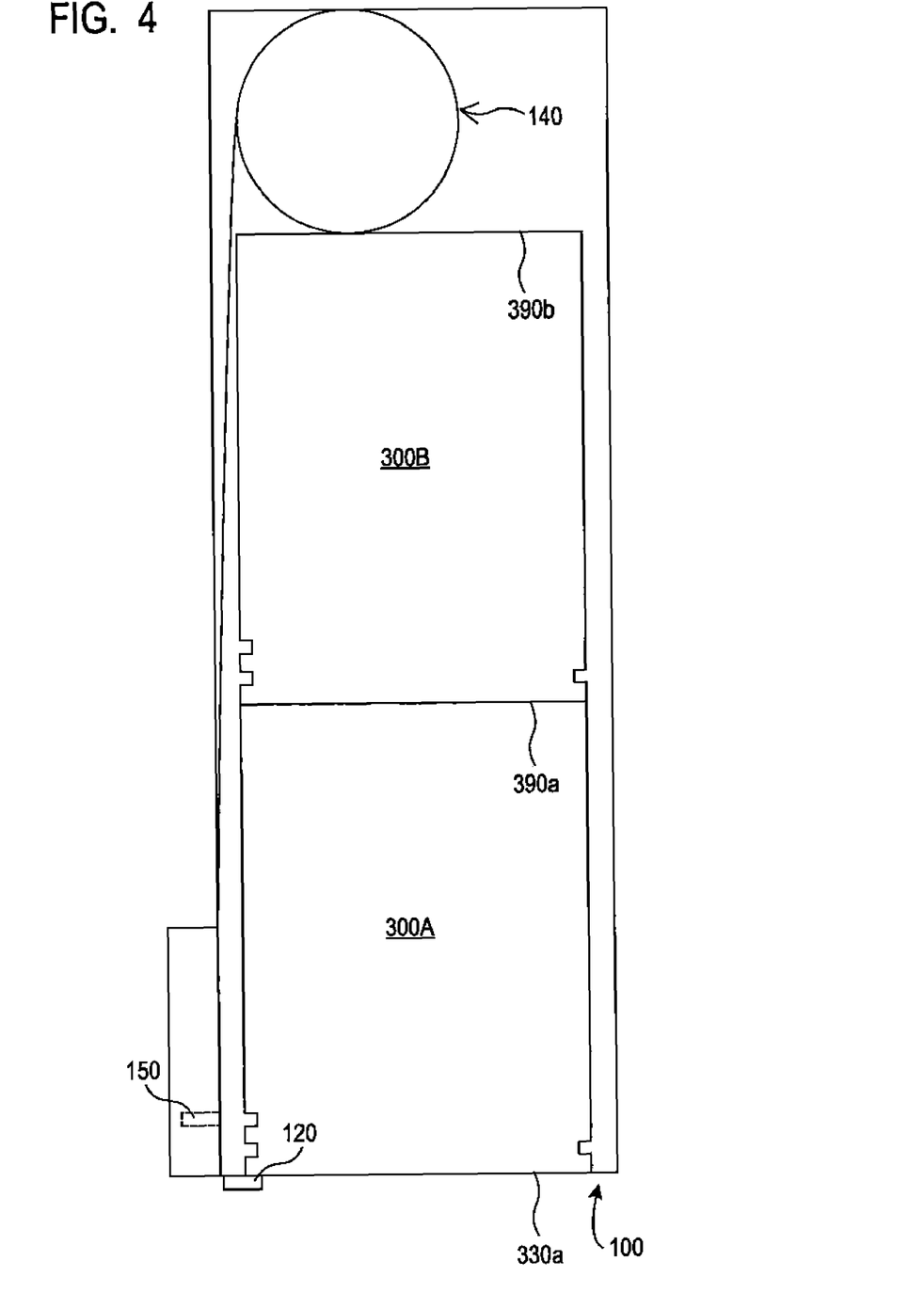
FIG. 4 shows two of the portable data storage cartridges of FIGS. 3A and 3B disposed in the storage slot of FIG. 1A.
Figure 5:
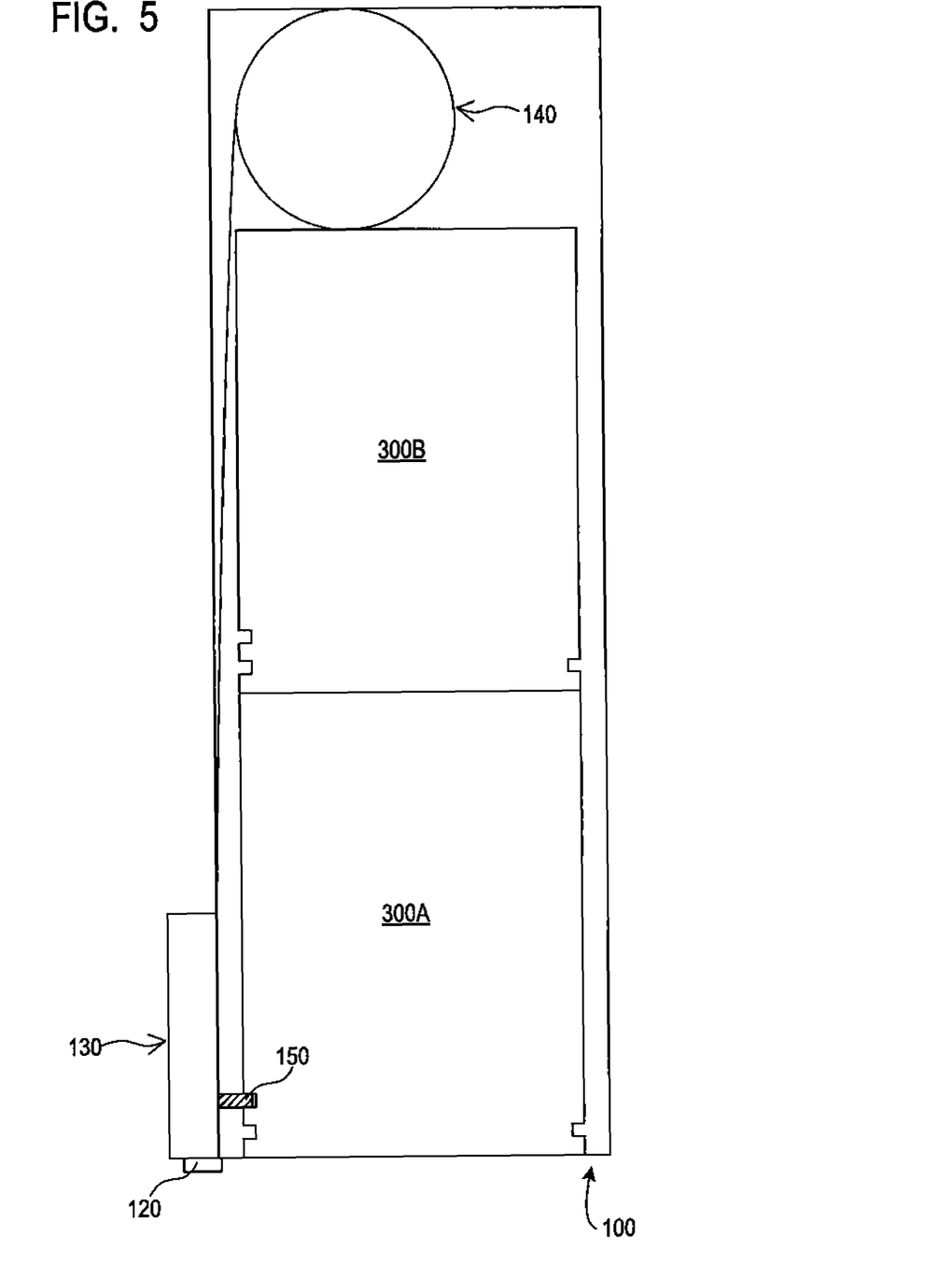
FIG. 5 is a block diagram showing two of the portable data storage cartridges of FIGS. 3A and 3B disposed in the storage slot of FIG. 1B.
Figure 6:
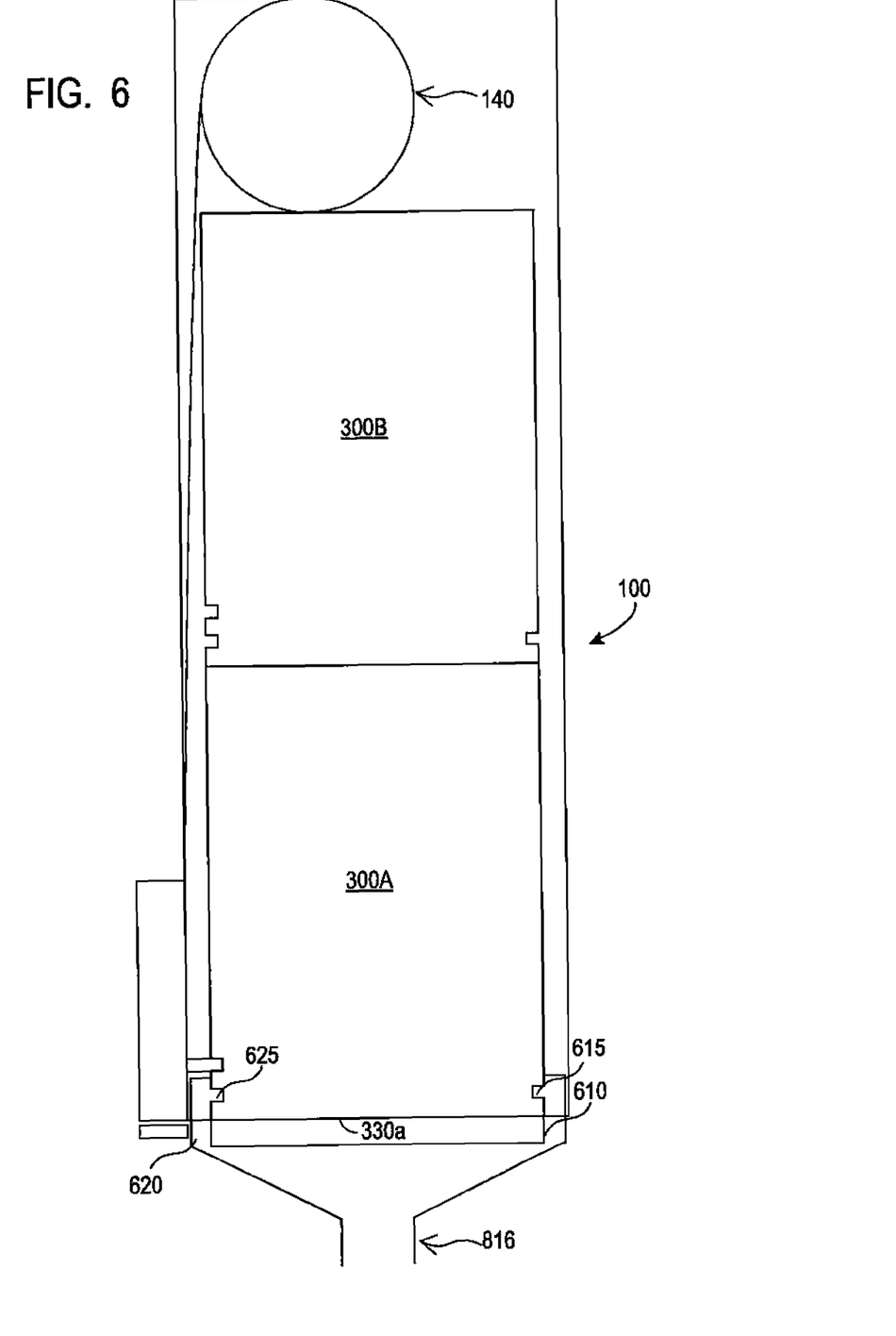
FIG. 6 illustrates a gripper mechanism coupled to one of Applicants' portable data storage cartridge, while that portable data storage cartridge is disposed in the storage slot of FIG. 1B.
Figure 7:
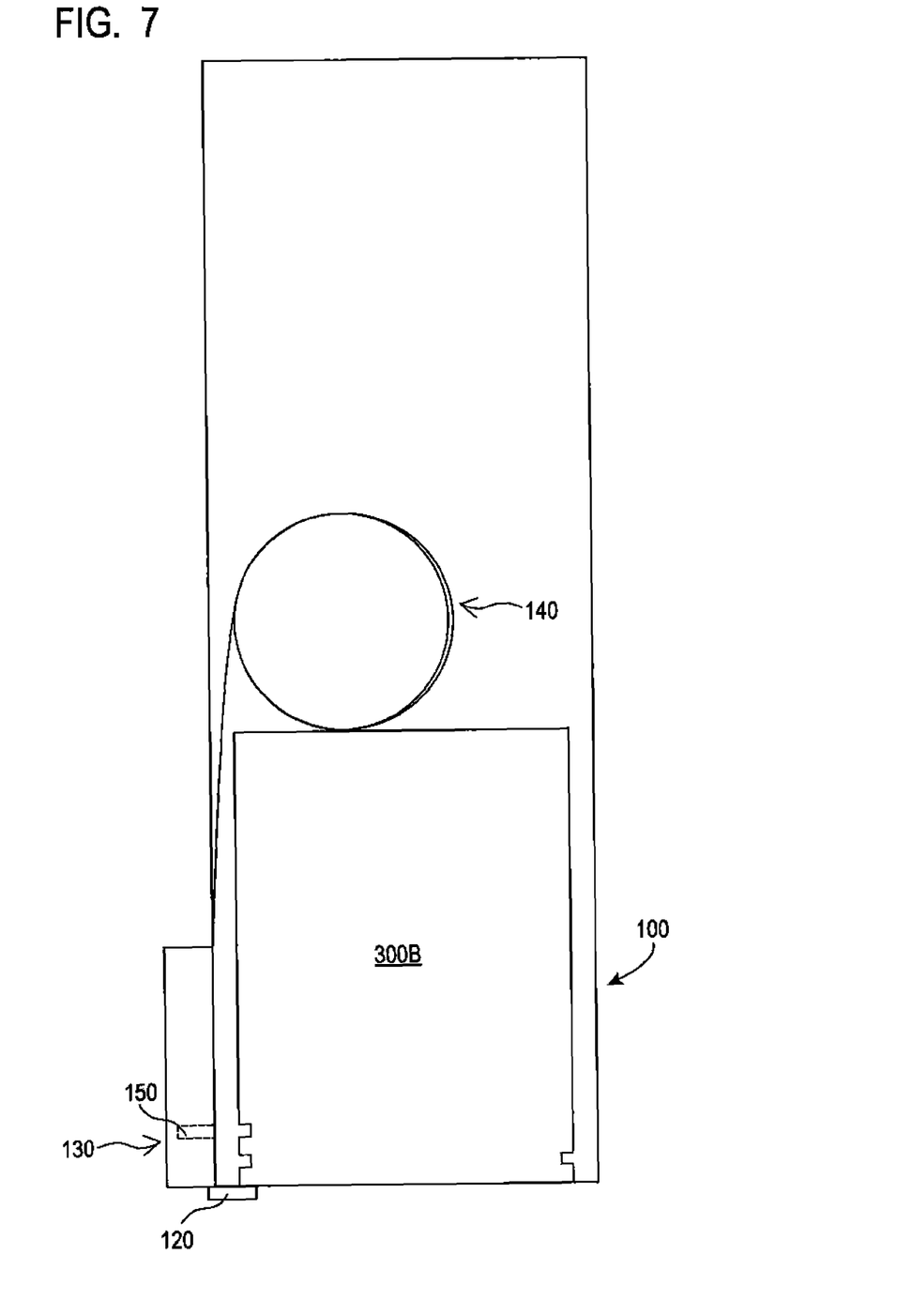
FIG. 7 shows the storage slot of FIG. 6 with one of the two portable data storage cartridges removed.
Figure 8A:
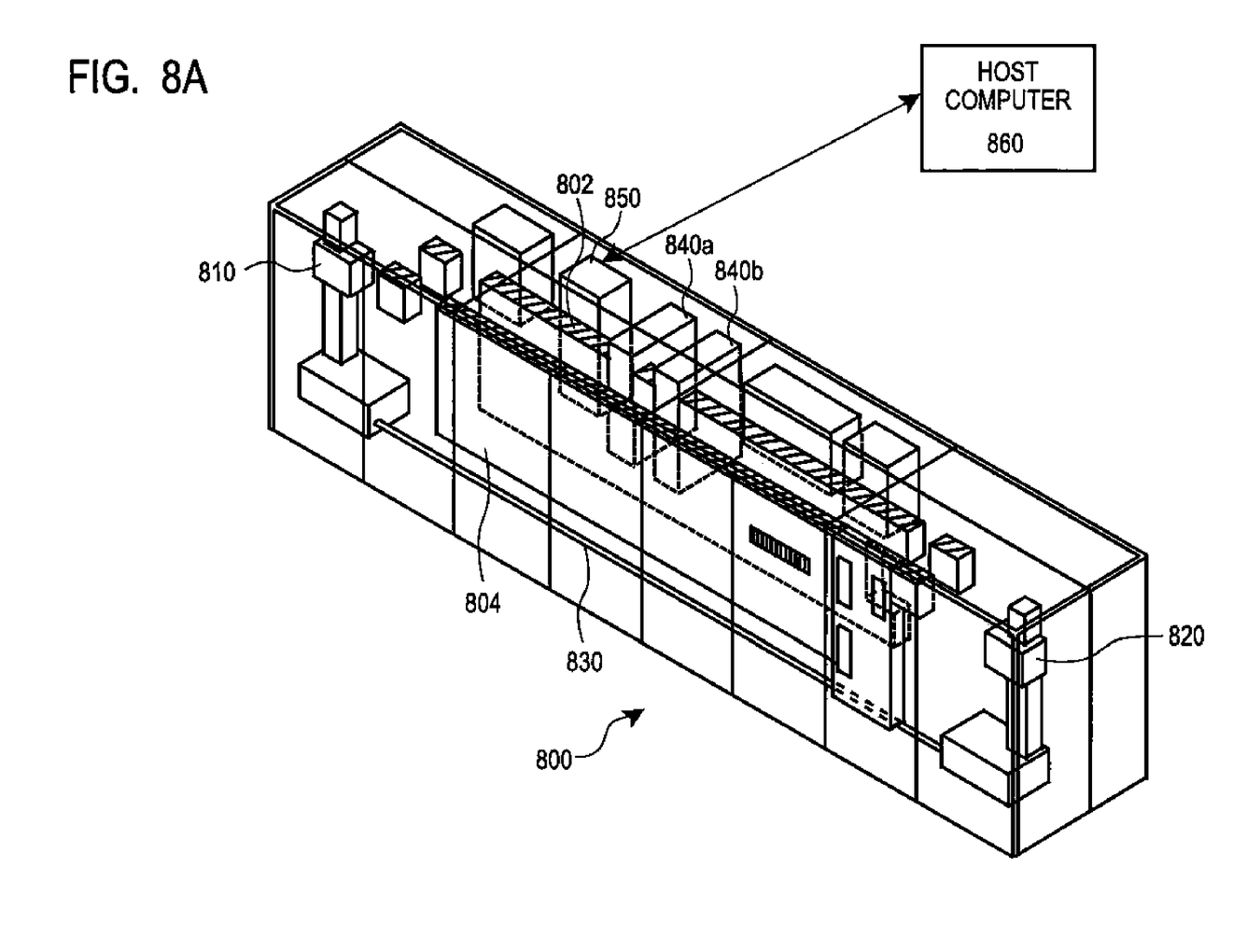
FIG. 8A illustrates a second embodiment of Applicants' data storage and retrieval system.

FIG. 8A shows information storage and retrieval system 800. System 800 comprises one or more data drives 840, such as 840a and 840b, and a storage controller 850. System 800 further comprises a plurality of Applicants' portable data cartridges 300 stored in a plurality of Applicants' storage slots 100 (FIGS. 1A, 1B, 1C, 1D, 1E, 4, 5, 6, 7) disposed in first storage wall 802 and/or second storage wall 804. In certain embodiments Applicants' storage slot 100 comprises a "deep cell" storage slot that can accommodate one or more portable data storage cartridges. For example FIGS. 4, 5, and 6, show two portable data storage cartridge, namely cartridges 300A and 300B, disposed one behind the other in storage slot 100 (FIGS. 1A, 1B, 1C, 1D, 1E, 4, 5, 6, 7).

System 800 further comprises at least one robotic accessor 810/820 for transporting a specified portable data cartridge 300 between a storage slot 100 disposed in storage wall 802/804 and a data drive 840. Accessors are moveably disposed along rail 830.

Figure 8B:
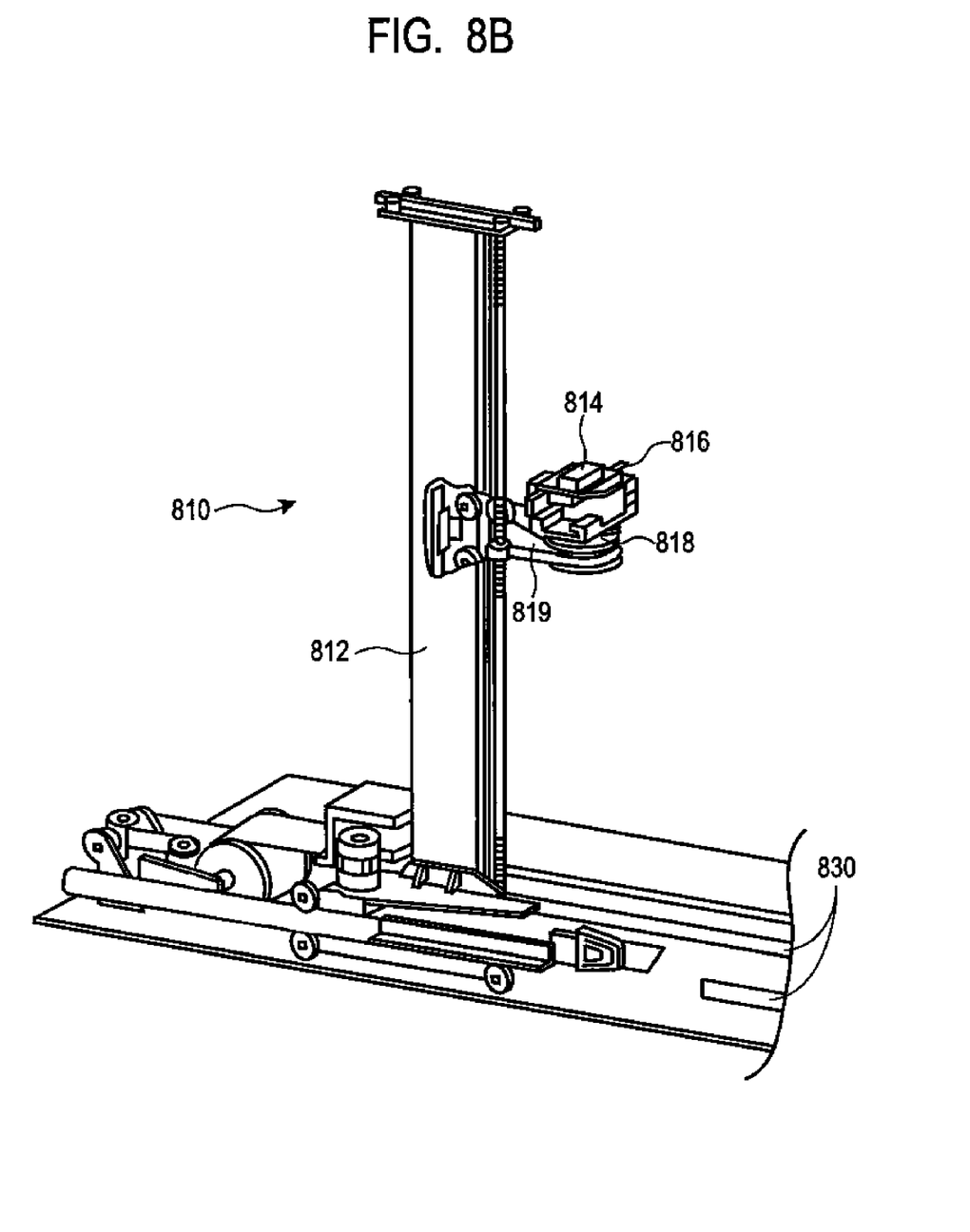
FIG. 8B is a perspective view of a robotic accessor moveably disposed in the data storage and retrieval system of FIG. 8A.

Referring now to FIGS. 8A and 8B, in certain embodiments accessors 810 and 820 each comprise a vertical pillar 812, a lifting servo section 819 moveably disposed on pillar 812 and comprising bar code scanner 814, first gripper 816, and second gripper 818. In the illustrated embodiment of FIG. 8A, data storage and retrieval system 800 is in communication with host computer 860.

As a general matter, host computer 860 comprises a computer system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, host computer 860 further comprises a storage management program. In certain embodiments, that storage management program includes the functionality to manage the transfer of data to and from a data storage and retrieval system, such as for example and without limitation the IBM DFSMS implemented in the IBM MVS operating system.

Storage controller 850 can receive a write and/or read command from host computer 860, whereunder data storage and retrieval system 800 writes information to, and/or reads information from, a data storage medium disposed in a designated one of the plurality of portable data storage cartridges 300. Storage controller 850 then dispatches accessor 810 or 820 to retrieve the designated portable data storage cartridge 300 from a designated one of Applicants' storage slot 100 (FIGS. 1A, 1B, 1C, 1D, 1E, 4, 5, 6, 7), transport that designated portable data storage cartridge 300 to a data drive 840, and dispose an information storage medium 320 (FIGS. 3A, 3B), disposed within the designated portable data storage cartridge, into the data drive 840. In certain embodiments, storage controller 850 then provides to the requesting host computer the information read from the data storage medium.

Figure 1A:
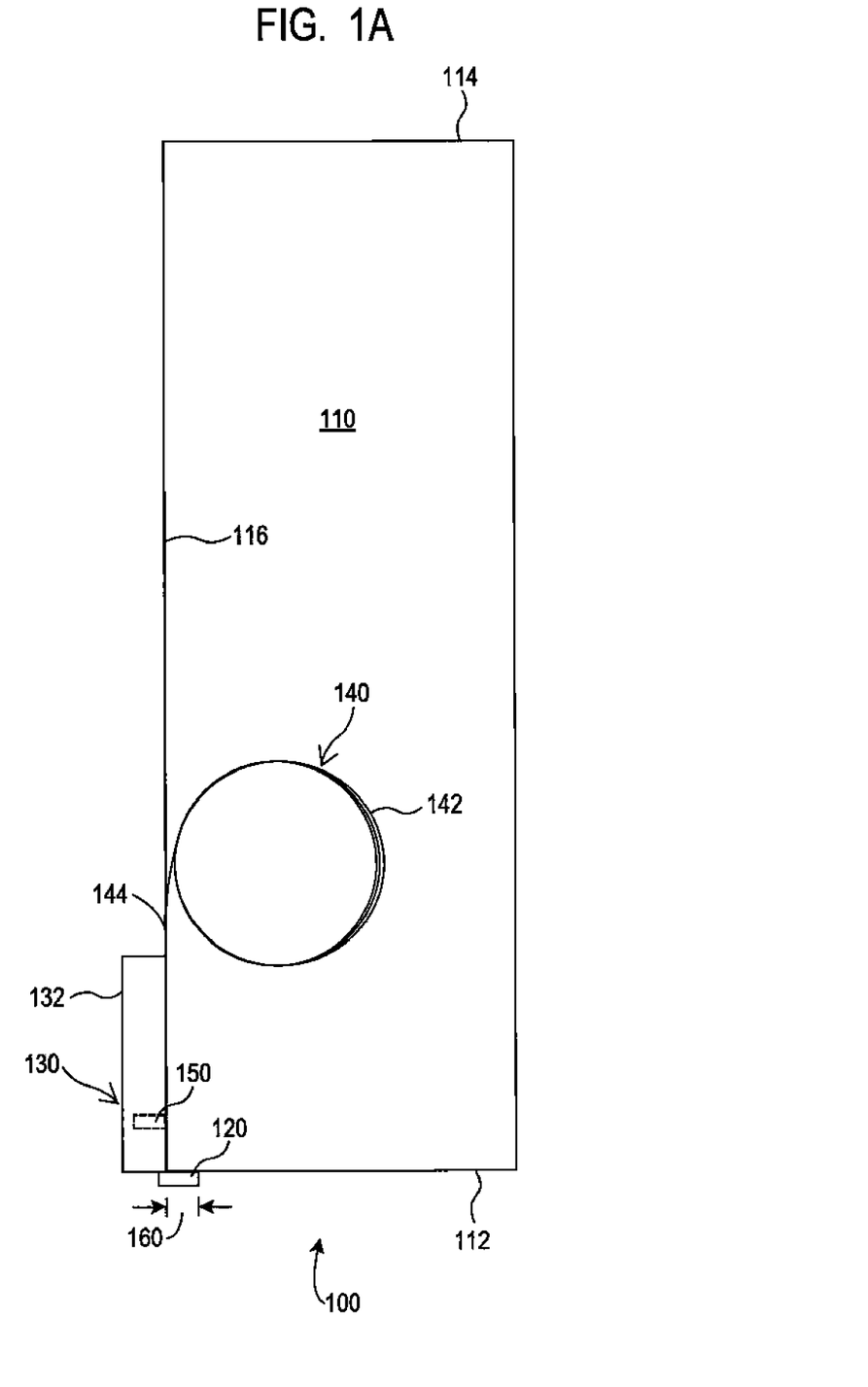
FIG. 1A is top view of Applicants' storage slot showing a gate element in a closed position.

Referring now to FIG. 1A, Applicants' storage slot 100 comprises a planar member 110 comprising a first end 112, a second end 114, and a side 116. Gate 120 is moveably disposed on side 116 at front 112. Storage slot 110 further comprises pushing mechanism 140. In the illustrated embodiment of FIG. 1A, pushing mechanism 140 comprises a coil of metal ribbon 142 having a first end 144 attached to side 116 at the distal end 132 of assembly 130. In other embodiments, pushing mechanism 140 comprises gravity.

Figure 1B:
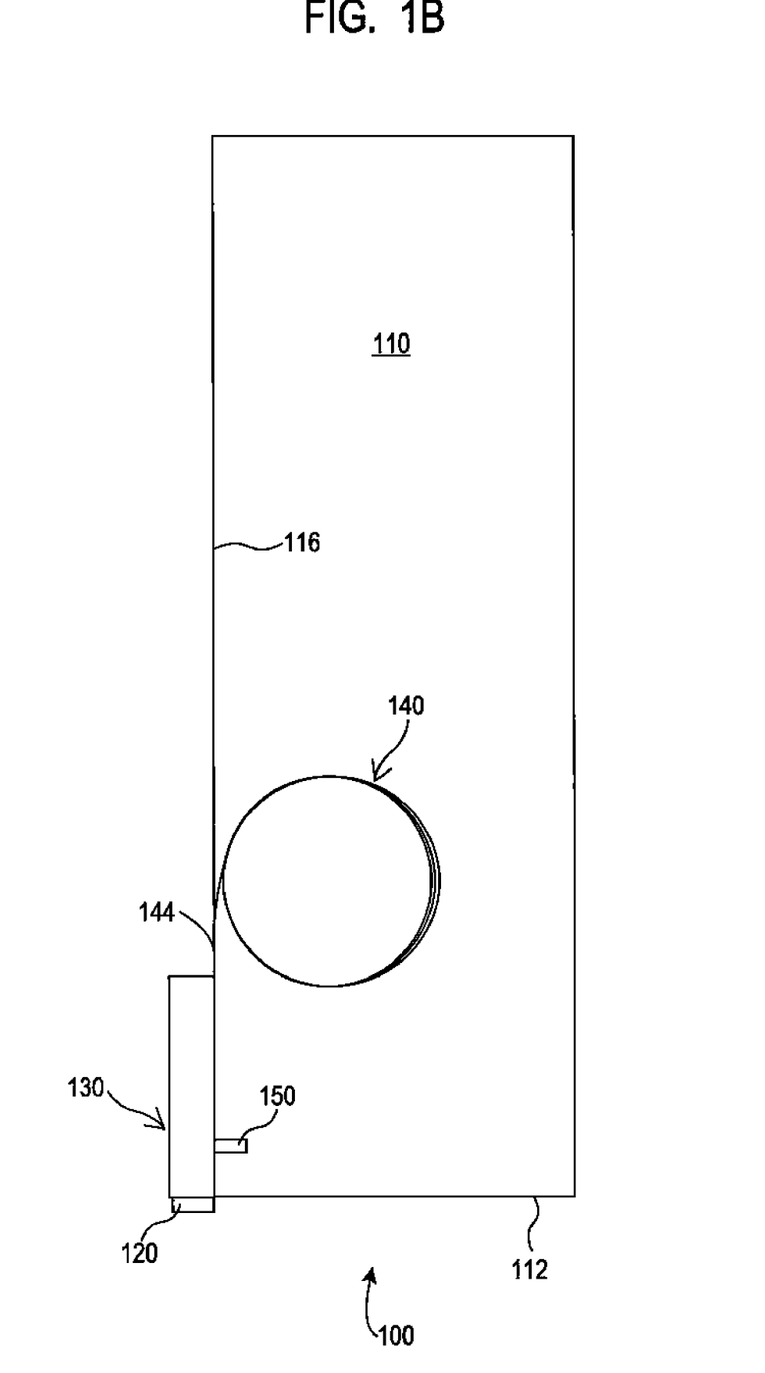
FIG. 1B is top view of the storage slot of FIG. 1A showing the gate element in an open position.

Referring now to FIGS. 1A and 1B, assembly 130 operatively couples gate 120 to secondary catch 150. In the illustrated embodiment of FIG. 1A, secondary catch 150 is disposed within assembly 130. When gate 120 is disposed in the "closed" position shown in FIG. 1A, secondary catch 150 is disposed in the "retracted" orientation shown in FIG. 1A. When gate 120 is disposed in the "open" position shown in FIG. 1B, secondary catch 150 is disposed in the "extended" orientation shown in FIG. 1B.

When gate 120 is disposed in the closed position of FIG. 1A, gate 120 blocks front 112 of storage slot by a distance 160. In certain embodiments, distance 160 is about fifty percent (50%) of front portion 112. In certain embodiments, distance 160 is about twenty-five percent (25%) of front portion 112. In certain embodiments, distance 160 is about 10 percent (10%) of front portion 112. In certain embodiments, distance 160 is about five percent (5%) of front portion 112.

Figure 1C:
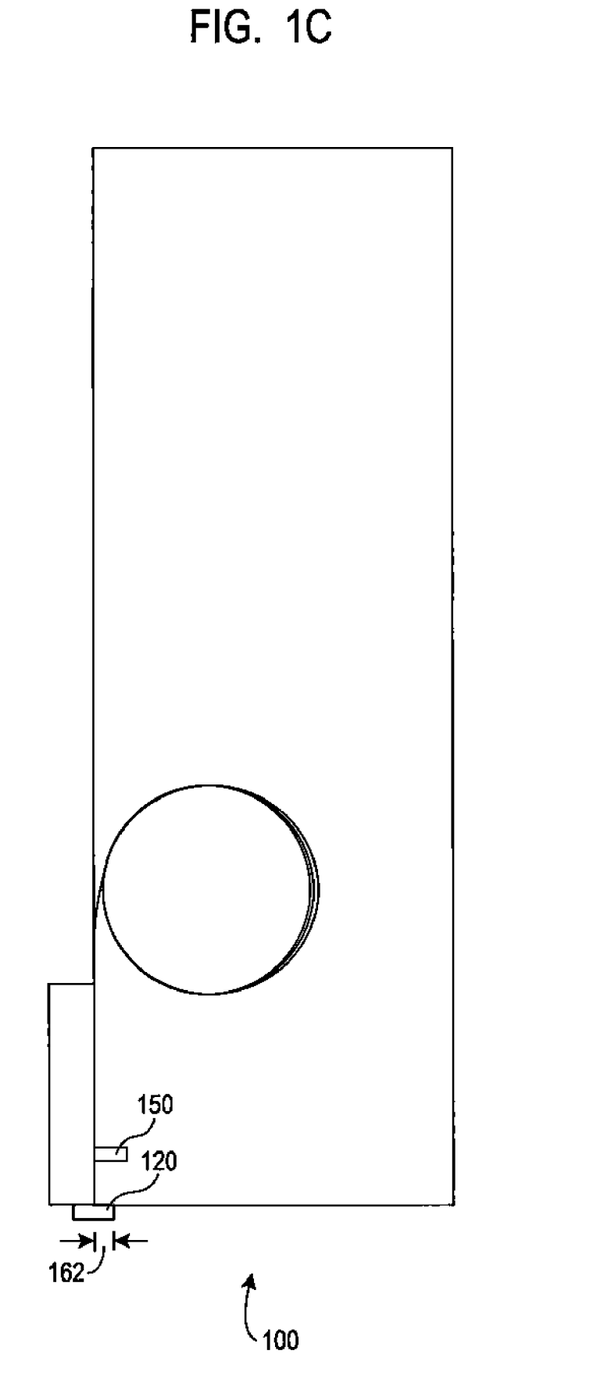
FIG. 1C is a top view of the storage slot of FIG. 1A showing a secondary catch element extending outwardly when the gate element is moved a first increment from the closed position of FIG. 1A to the open position of FIG. 1B.
Figure 1D:
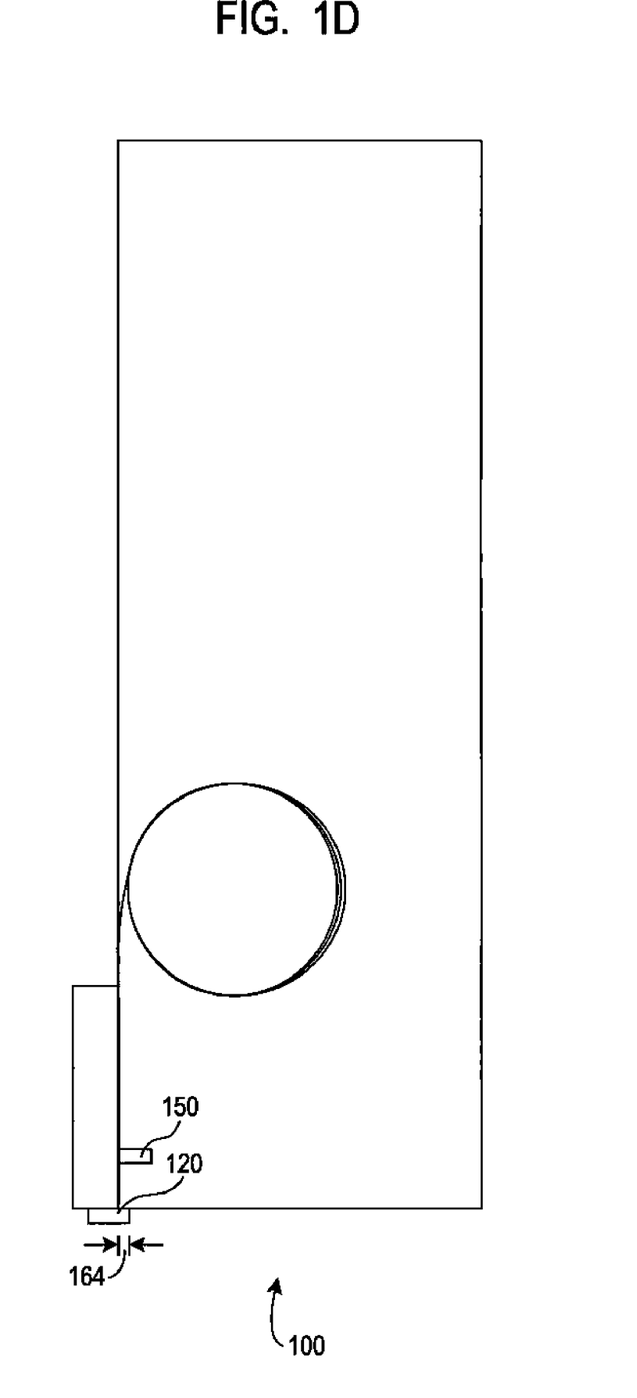
FIG. 1D is a top view of the storage slot of FIG. 1A showing a secondary catch element extending outwardly when the gate element is moved a second increment from the closed position of FIG. 1A to the open position of FIG. 1B.
Figure 1E:
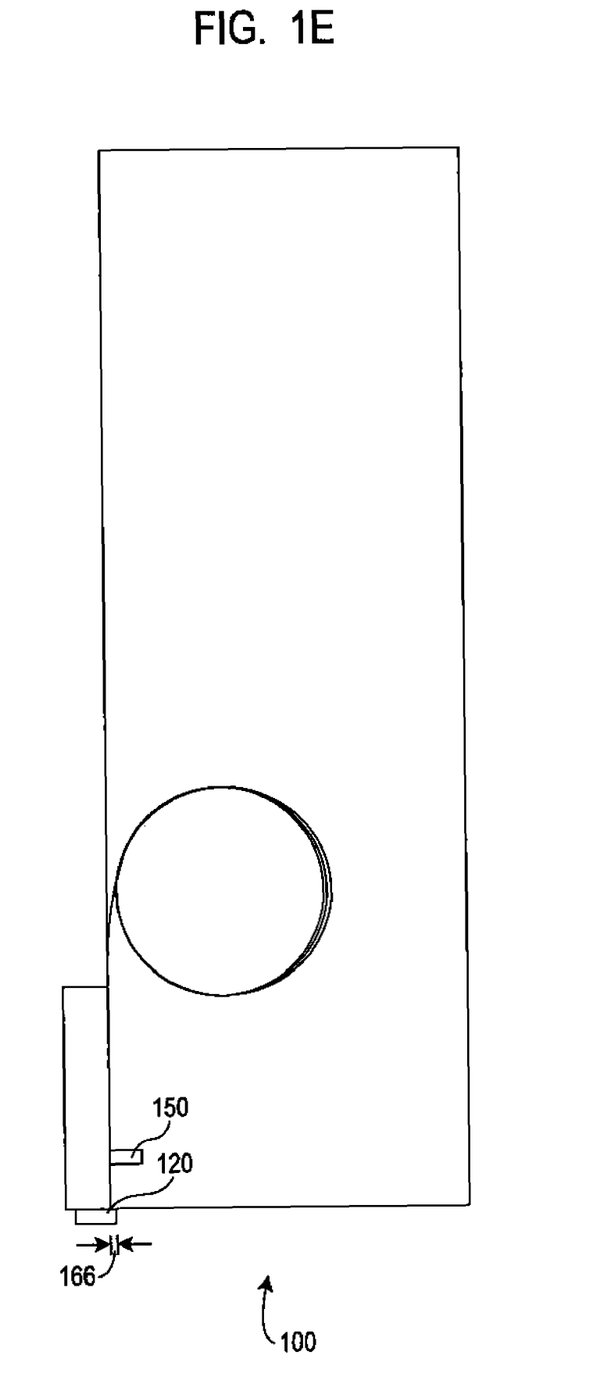
FIG. 1E is a top view of the storage slot of FIG. 1A showing a secondary catch element extending outwardly when the gate element is moved a third increment from the closed position of FIG. 1A to the open position of FIG. 1B.

Referring now to FIG. 1C, in certain embodiments secondary catch 150 extends outwardly when gate 120 is moved about twenty-five percent (25%) of from the closed position of FIG. 1A toward the open position of FIG. 1B, i.e. when distance 162 equals about (0.75) times 164 (FIG. 1A). Referring now to FIG. 1D, in certain embodiments secondary catch 150 extends outwardly when gate 120 is moved about fifty percent (50%) of from the closed position of FIG. 1A toward the open position of FIG. 1B, i.e. when distance 164 equals about (0.5) times 164 (FIG. 1A). Referring now to FIG. 1E, in certain embodiments secondary catch 150 extends outwardly when gate 120 is moved about seventy-five percent (75%) of from the closed position of FIG. 1A toward the open position of FIG. 1B, i.e. when distance 164 equals about (0.25) times 164 (FIG. 1A).

Figure 3:
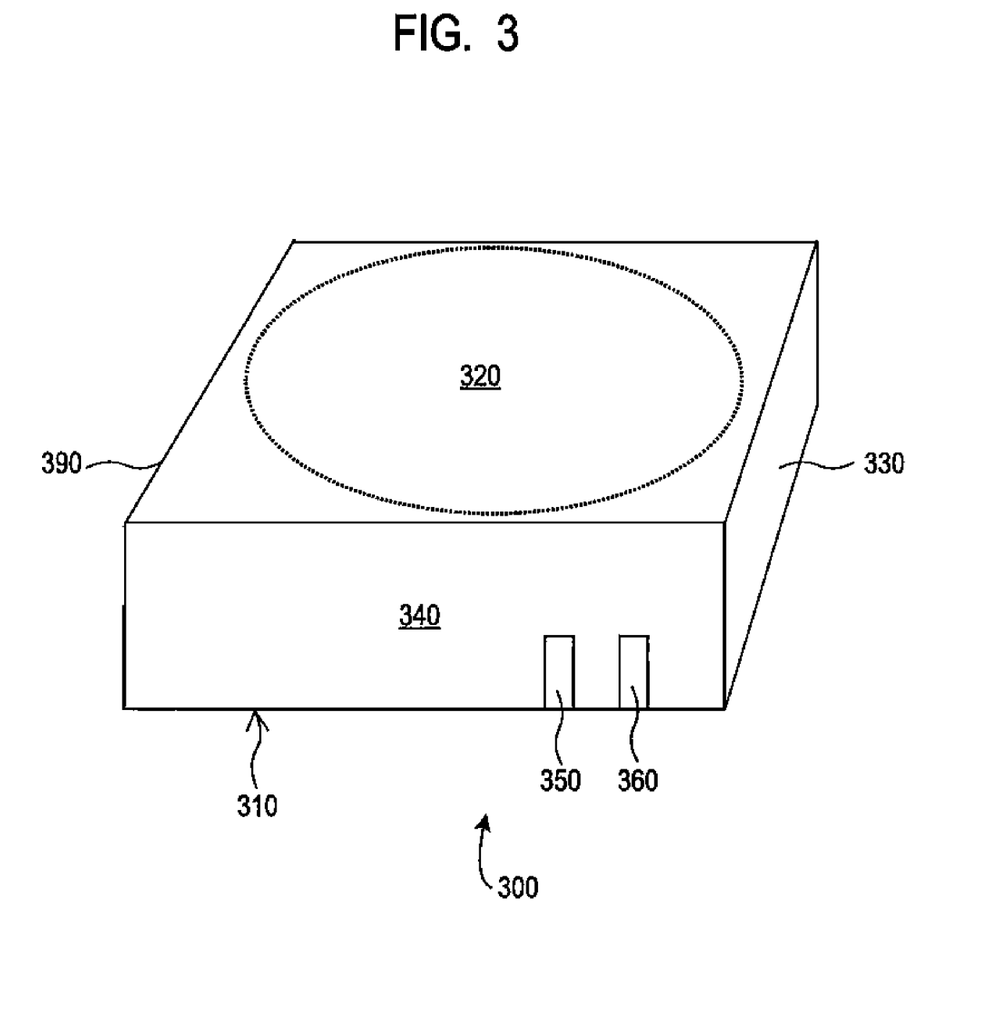
FIG. 3 shows a first perspective view of Applicants' portable data storage cartridge.

Referring now to FIG. 3, Applicants' portable data storage cartridge 300 comprises a housing 310, wherein housing 310 comprises front 330, first side 340, second side 370, and rear 390. First side 340 is formed to include aperture 350 extending inwardly therein, and aperture 360 extending inwardly therein. Data storage medium 320 is disposed within housing 310.

In certain embodiments, data storage medium 320 comprises a magnetic storage medium, such as a hard disk, tape, and the like. In embodiments wherein data storage medium 320 comprises a magnetic tape, data storage device 840 (FIG. 8A) comprises a tape drive. In certain embodiments, data storage medium 320 comprises an optical storage medium, such as a CD, DVD, and the like. In certain embodiments, data storage medium 320 comprises an electronic storage medium, such as an PROM, EPROM, EEPROM, and the like. In certain embodiments, data storage medium 320 comprises a holographic data storage medium.

FIG. 4 shows data storage cartridges 300A and 300B removeably disposed in Applicants' storage slot 100. Data storage cartridge 300B is disposed behind data storage cartridge 300A. Pushing mechanism 140 urges data storage cartridge 300B forwardly which pushes front portion 300 of data storage cartridge 300A against gate 120.

Referring now to FIGS. 4 and 5, in the illustrated embodiment of FIG. 5, gate 120 has been moved from the closed position of FIG. 4 to an open position. FIG. 5 further shows secondary catch 150 extending outwardly from assembly 230 and into aperture 350. Secondary catch 150 prevents pushing mechanism 140 from moving data storage cartridges 300A and 300B out of storage slot 100 when gate 120 is open.

Referring now to FIGS. 6, 8A, and 8B, storage controller 850 positions an accessor, such as accessor 810, and positions the lifting servo section 819 disposed on that accessor, such that a gripper, such as gripper 816, is disposed adjacent front 330 of the designated portable data storage cartridge 300, such as portable data storage cartridge 300A (FIGS. 5, 6). In the illustrated embodiment of FIG. 6, gripper 816 comprises first arm 610 and second arm 620. First arm 610 comprises attachment member 615. Second arm 620 comprises attachment member 625.

In the illustrated embodiment of FIG. 6, attachment member 625 is inserted into aperture 360 formed in the housing for portable data storage cartridge 300A. Gripper 816 then exerts sufficient force outwardly on portable data storage cartridge 300A to force secondary catch 150 inwardly by flexing flexible member 250, and pull portable data storage cartridge out of storage slot 100.

After accessor 810 retrieves portable data storage cartridge 300A from storage slot 100, pushing mechanism 140 urges portable data storage cartridge 300B downwardly until the front 330 of portable data storage cartridge 300B contacts closed gate 120. FIG. 7 shows portable data storage cartridge 300B disposed against closed gate 120, with secondary catch 150 disposed in the retracted orientation of FIGS. 1A and 2A.

Figure 2A:
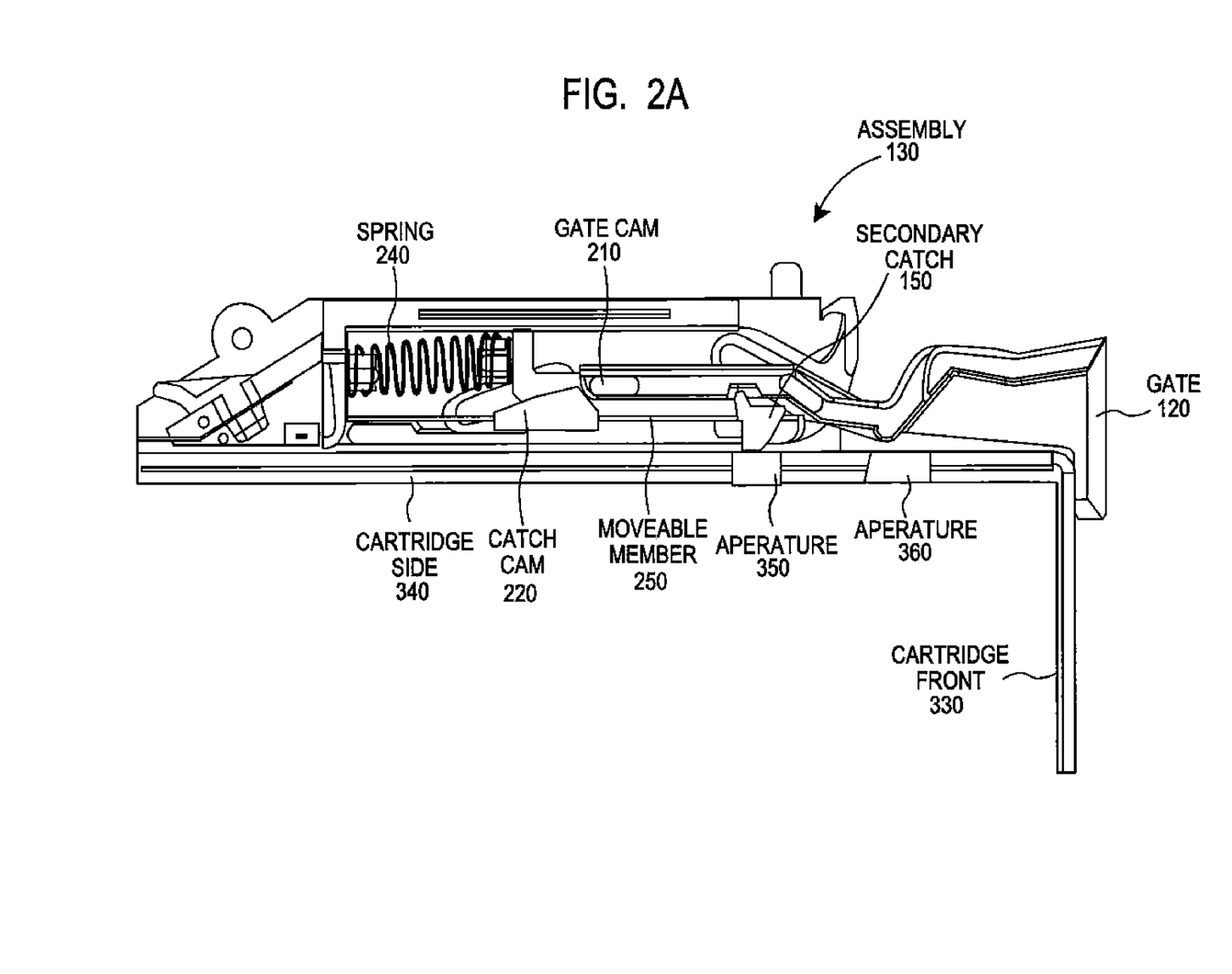
FIG. 2A illustrates the elements of an assembly interconnecting the gate and a secondary catch, wherein the gate is shown in the closed position of FIG. 1A.
Figure 2B:
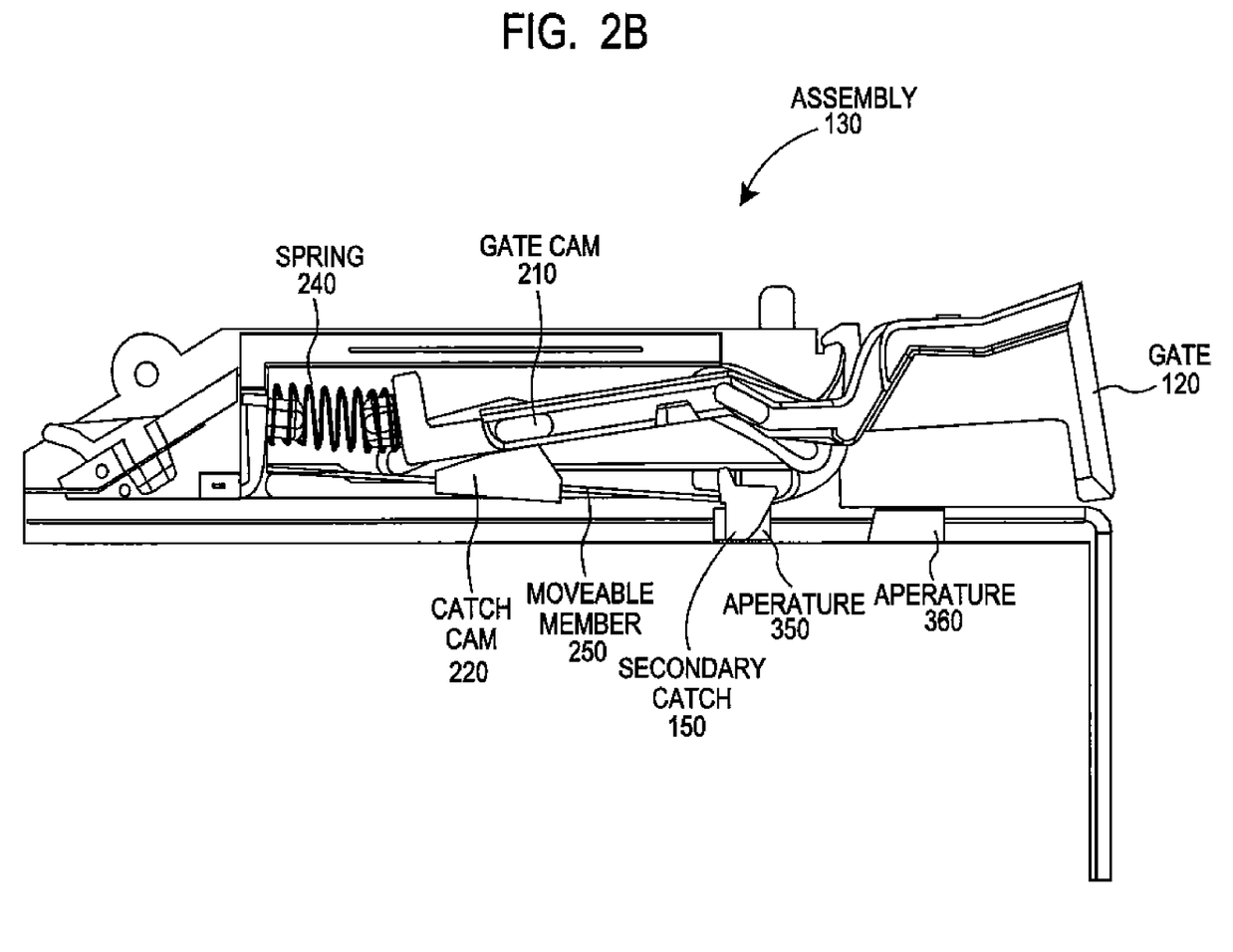
FIG. 2B illustrates the elements of an assembly interconnecting the gate and a secondary catch, wherein the gate is shown in the open position of FIG. 1B.

FIGS. 2A and 2B comprise a bottom view of assembly 130. Referring now to FIGS. 2A and 2B, assembly 130 comprises gate cam 210, catch cam 220, compression spring 240, and flexible member 250. When gate 120 is moved from the closed position of FIGS. 1A and 2A to the open position of FIGS. 1B and 2B, gate cam 220 is moved up and over catch cam 220, thereby pushing catch cam downwardly. As a result, secondary catch 150 is pushed outwardly into the extended orientation of FIGS. 1B and 2B.

While the preferred embodiments of the present invention have been illustrated in detail, it should be apparent that modifications and adaptations to those embodiments may occur to one skilled in the art without departing from the scope of the present invention as set forth in the following claims.

We claim:
1. A storage slot for data storage cartridges, comprising:
a planar member having a first end, a second end, and a side interconnecting said first end and said second end;
a gate moveably connected to said side at said first end of said planar member, wherein said gate can be moved between a closed position and an open position;
a secondary catch moveably disposed between said first end and said second end;
wherein when said gate is disposed in a closed position, said secondary catch is disposed in a retracted orientation; and
wherein when said gate is disposed in an open position, said secondary catch is disposed in an extended orientation.

2. The storage slot of claim 1, wherein one or more portable data storage cartridges can be removeably disposed in said storage slot.

3. The storage slot of claim 2, further comprising:
a plurality of said portable data storage cartridges removeably disposed therein; and
a pushing mechanism urging said plurality of portable data storage cartridges against said gate.

4. The storage slot of claim 1, wherein:
a portable data storage cartridge disposed against said gate comprises a housing formed to include an aperture extending inwardly from a side of said housing, wherein said side of said housing has a facing relationship with said side of said storage slot;
when said gate is moved from said closed position to said open position, said secondary catch moves from said retracted orientation to said extended orientation, and extends inwardly into said aperture.

5. The storage slot of claim 1, further comprising a coupling assembly interconnecting said gate to said secondary catch, said coupling assembly comprising:
a catch cam comprising a first side attached to a first end of a flexible member, wherein a second end of said flexible member is moveably connected to said secondary catch;
a gate cam having a first end and a second end, wherein said first end of said gate cam is moveably connected to a proximal end of said gate, and wherein said second end of said gate cam is moveably disposed against said first side of said catch cam;
a spring coupled to a pivotable lever, wherein a distal end of said pivotable lever is moveably disposed against a second side of said catch cam;
wherein:
when said gate is moved from said closed position to said open position, said gate cam is moved upwardly along said first side of said catch cam;
said pivotable lever pushes said catch cam forwardly;
said moveable member is moved forwardly; and
said secondary catch is pushed outwardly into said extended orientation.

6. A data storage and retrieval system, comprising:
a plurality of storage slots;
a data storage device;
a robotic accessor to transport portable data storage cartridges from said plurality of storage slots to said data storage device;
wherein each of said plurality of storage slots comprises:
a planar member having a first end, a second end, and a side interconnecting said first end and said second end;
a gate moveably connected to said side at said first end of said planar member, wherein said gate can be moved between a closed position and an open position;
a secondary catch moveably disposed between said first end and said second end;
wherein when said gate is disposed in a closed position, said secondary catch is disposed in a retracted orientation; and
wherein when said gate is disposed in an open position, said secondary catch is disposed in an extended orientation.

7. The data storage and retrieval system of claim 6, wherein each storage slot further comprises a pushing mechanism urging one or more portable data storage cartridges disposed therein toward said first end.

8. The data storage and retrieval system of claim 6, further comprising:
a plurality of portable data storage cartridges; and
wherein one or more portable data storage cartridges can be removeably disposed in each of said plurality of data storage slots.

9. The data storage and retrieval system of claim 8, wherein:
each of said plurality of portable data storage cartridges comprises a housing formed to include an aperture extending inwardly from a side of said housing, wherein said side of said housing has a facing relationship with said side of said storage slot;
if said gate is moved from said closed position to said open position, said secondary catch moves from said retracted orientation to said extended orientation, and extends inwardly into the aperture formed in the housing of the portable data storage cartridge disposed at said first end of said storage slot, thereby preventing said pushing mechanism from pushing said portable data storage cartridge outwardly from said storage slot.

10. The data storage and retrieval system of claim 6, wherein each storage slot further comprises a coupling assembly interconnecting said gate to said secondary catch, said coupling assembly comprising:
a catch cam comprising a first side attached to a first end of a flexible member, wherein a second end of said flexible member is moveably connected to said secondary catch;
a gate cam having a first end and a second end, wherein said first end of said date cam is moveably connected to a proximal end of said gate, and wherein said second end of said gate cam is moveably disposed against said first side of said catch cam;
a spring coupled to a pivotable lever, wherein a distal end of said pivotable lever is moveably disposed against a second side of said catch cam;
wherein:
when said gate is moved from said closed position to said open position, said gate cam is moved upwardly along said first side of said catch cam;
said pivotable lever pushes said catch cam forwardly;

said moveable member is moved forwardly; and said secondary catch is pushed outwardly into said extended orientation.

11. A method to write information to, or read information from, a data storage medium, comprising the steps of:

providing a data storage and retrieval system, comprising a data storage device, a robotic accessor moveably disposed therein, a portable data storage cartridge removeably disposed in a storage slot;

receiving a command from a host computer in communication with said data storage and retrieval system to read information from, or write information to, a data storage medium disposed with said portable data storage cartridge;

retrieving said portable data storage cartridge from said storage slot;

transporting said portable data storage cartridge to said data storage device;

disposing said data storage medium in said data storage device;

reading information from, or writing information to, said data storage medium;

wherein said storage slot comprises:

a planar member having a first end, a second end, and a side interconnecting said first end and said second end;

a gate moveably connected to said side at said first end of said planar member, wherein said gate can be moved between a closed position and an open position;

a secondary catch moveably disposed between said first end and said second end;

wherein when said gate is disposed in a closed position, said secondary catch is disposed in a retracted orientation; and wherein when said gate is disposed in an open position, said secondary catch is disposed in an extended orientation.

12. The method of claim 11, wherein said storage slot further comprises a coupling assembly interconnecting said gate to said secondary catch, said coupling assembly comprising:

a catch cam comprising a first side attached to a first end of a flexible member, wherein a second end of said flexible member is moveably connected to said secondary catch;

a gate cam having a first end and a second end, wherein said first end of said date cam is moveably connected to a proximal end of said gate, and wherein said second end of said gate cam is moveably disposed against said first side of said catch cam;

a spring coupled to a pivotable lever, wherein a distal end of said pivotable lever is moveably disposed against a second side of said catch cam;

wherein:

when said gate is moved from said closed position to said open position, said gate cam is moved upwardly along said first side of said catch cam;

said pivotable lever pushes said catch cam forwardly;

said moveable member is moved forwardly; and said secondary catch is pushed outwardly into said extended orientation.

13. The method of claim 11, wherein one or more portable data storage cartridges can be removeably disposed in said data storage slot.

14. The method of claim 11, wherein said storage slot further comprises a pushing mechanism urging said portable data storage cartridge forward against said gate.

15. The method of claim 11, wherein:

said portable data storage cartridge comprises a housing formed to include a first aperture extending inwardly from a first side of said housing, wherein said first side of said housing has a facing relationship with said side of said storage slot;

if said gate is moved from said closed position to said open position, said secondary catch moves from said retracted orientation to said extended orientation, and extends inwardly into said first aperture, thereby preventing said pushing mechanism from pushing said portable data storage cartridge outwardly from said storage slot.

16. The method of claim 15, wherein robotic accessor comprises:

a vertical pillar;

a lifting servo section moveably disposed on said vertical pillar;

a gripper mechanism disposed on said lifting servo section.

17. The method of claim 16, wherein said retrieving step comprises the steps of:

adjusting the location of said robotic accessor within said data storage and retrieval system, and adjusting the position of said lifting servo section, such that said gripper mechanism to disposed adjacent said storage slot;

moving said gate from said closed position to said open position;

extending said secondary catch into said first aperture;

grasping said portable data storage cartridge by said gripper mechanism;

pulling said data storage cartridge outwardly from said storage slot.

18. The method of claim 15, wherein:

said housing further comprises a second side and a front portion;

said housing is further formed to include a second aperture extending inwardly into said first side, wherein said second aperture is formed between said front portion and said first aperture;

said gripper mechanism comprises a finger;

wherein said grasping step comprises:

extending said finger into said second aperture.

19. The method of claim 11, wherein said data storage medium comprises a magnetic tape and wherein said data storage device comprises a tape drive.

20. The method of claim 11, further comprising the steps of:

providing information read from said data storage medium to said host computer.

* * * * *